March 13, 1934.   H. THOMPSON   1,951,261
AUTOMOBILE DESK
Filed April 5, 1933
Fig.1.
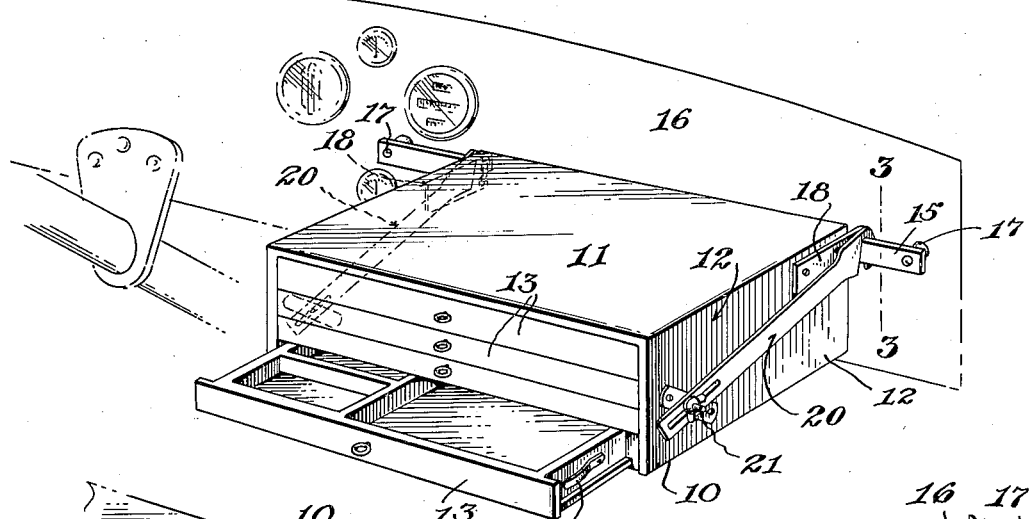
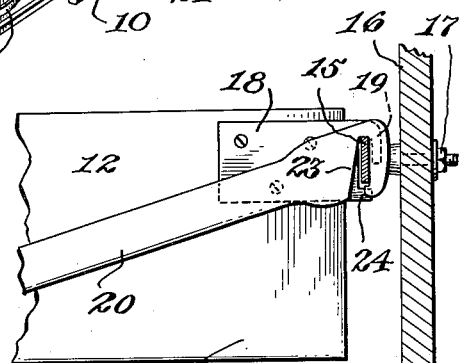
Fig.2.
Fig.3.
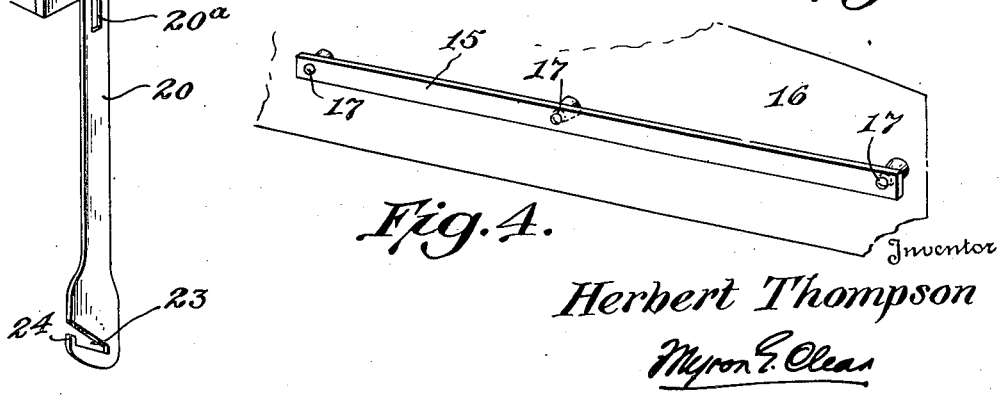
Fig.4.
Inventor
Herbert Thompson
Myron G. Clear
By
Attorney Patented Mar. 13, 1934

1,951,261

UNITED STATES PATENT OFFICE 1,951,261

AUTOMOBILE DESK

Herbert Thompson, Hollandale, Miss.

Application April 5, 1933, Serial No. 664,605

3 Claims. (Cl. 45—51)

My present invention relates generally to desks and more particularly to readily portable desks, my primary object being the provision of a desk of that nature which may be conveniently used in an automobile and easily and quickly removed therefrom.

More especially, my invention aims to provide a desk capable of general use in connection with automobiles, and especially suitable for the use of rural mail carriers, and one so mounted as to be easily shiftable to and from the operator of the vehicle, and, while normally held in an effective manner, may be easily detached and removed from the vehicle when desired.

A further object is to bring about an effective connection of the desk to the automobile with as little change in the latter as possible, and with a normally slidable connection, permitting shifting of the desk toward and away from the operator's seat, which will, at the same time permit of easy and quick attachment of the desk to, and its detachment from, an automobile.

With the above in mind, my invention will be better understood and more thoroughly appreciated by reference to the accompanying drawing, which forms a part of this specification, and wherein, Figure 1 is a perspective view, illustrating the practical application of my invention to the instrument panel of an automobile.

Figure 2 is a detail perspective view of one end of my improved desk cabinet, partly removed from its support.

Figure 3 is a detail vertical sectional view, taken on line 3—3 of Figure 1, and Figure 4 is a detail perspective view of the supporting bar.

Referring now to these figures, my invention contemplates the provision of a desk cabinet for automobiles, that is preferably a rectangular box-like cabinet 10, presenting a closed top 11, forming a writing surface, and having closed ends 12, and a closed bottom and rear side wall. At its front, the cabinet is preferably open to the reception of a series of drawers 13, each of which may have spring or other means 14 to normally hold the same in closed position against the dislodging tendencies of vehicular vibrations, and each of which may be divided or partitioned to suit the needs of the particular use to which it is put. Suffice to say the cabinet drawers are adapted to contain the writing materials, forms, and the like, within easy reach of the operator of the vehicle.

For the above purposes, and in order that the desk cabinet may be quickly moved to such a position that the vehicle operator may write thereon without leaving his seat, and just as quickly shifted away from the operator after use thereof, it is mounted to slide upon a suitable support which will admit of such movements. Furthermore, this mounting is a special one since it is also highly desirable that the desk cabinet be easily and bodily removable from the vehicle and as readily replaceable therein.

I propose, therefore, to secure a supporting bar 15 lengthwise of the instrument panel 16 of a vehicle, either by the bolts commonly used in connection with the panel where it is not necessary to specially bore the same, or by special bolts 17, so that the bar is spaced throughout its length from the panel. Thus it may be engaged by hook members 18 rigidly fixed to the cabinet ends 12 as by means of screws and like fastening means.

The hook members 18 are flat plates recessed at their rearwardly projecting ends so as to receive the bar 15, and provided with depending fingers 19 partially overlying the recesses thereof so that the cabinet must be tilted or canted with respect to its normal horizontal position in order to be associated with and removed from the bar. Thus a sliding connection is completed between the cabinet and the supporting bar 15 so that the operator may pull the cabinet to him when it is to be used, or push it away from him after use, leaving him free access to the instrument panel and the controls of the vehicle.

Since the vibrations of the vehicle might dislodge the cabinet from the bar, I preferably provide means to avoid this, in the nature of latch arms 20 at the ends of the cabinet. Each of these arms has a lengthwise slot 20ª at its forward end receiving a bolt 21 projecting rigidly from the cabinet end, and this end of the arm may be clamped by a thumb screw or wing nut 22 working on the bolt 21. At its rear end each arm 20 has a generally transverse recess 23 so that this end of the arm may receive, and be seated on, the supporting bar. The latter end of the arm also has a hook 24 which seats beneath the supporting bar when the arm is pulled forwardly and clamped. It is to be understood that these latch arms simply prevent upward tilting of the cabinet with respect to the supporting bar and do not prevent sliding movement of the cabinet on the bar. They fit over the bar sufficiently loose so that when the wing nuts 22 are loosened, the arms may be pressed slightly rearwardly and then raised off of the supporting bar, leaving the cabinet free to be removed in the manner previously described.

Such a cabinet desk may be employed with great convenience by various salemen using automobiles to cover their sales routes, and will be found especially so by rural mail carriers and in special delivery service.

Having thus fully described my invention, what I claim is,

1. The combination with a motor vehicle, including an operator's seat, and an instrument panel, of a supporting bar in connection with, and lengthwise of, said instrument panel, a desk-like cabinet, means to detachably hold the cabinet in connection with said bar and for sliding movement longitudinally thereof, and laterally of the vehicle toward and away from the operator's seat and means adjustably in connection with said bar and said cabinet to normally prevent disengagement of said first named means from the bar.

2. In combination with a motor vehicle having an operator's seat, and an instrument panel, a supporting bar secured lengthwise of, and spaced from, said panel, a desk-like cabinet, hook members carried by the cabinet slidable on said bar and engageable therewith and disengageable therefrom, and means adjustably connected to the cabinet slidably in engagement with the bar to normally prevent disengagement of said hook members from the bar.

3. In combination with a motor vehicle having an operator's seat, a supporting bar secured therein adjacent to said seat, a desk-like cabinet, hook members carried by said cabinet and detachably in sliding connection with the said bar whereby the cabinet may be moved toward and away from the operator's seat, and locking arms adjustably clamped at one end to the cabinet and having opposite recessed ends fitting over the bar and slidable thereon to normally prevent detachment of the cabinet from the bar.

HERBERT THOMPSON.